United States Patent [19]

Guangorena

[11] 4,054,266
[45] Oct. 18, 1977

[54] THREE SPEED DECK WINCH

[75] Inventor: Jesus Guangorena, Atherton, Calif.

[73] Assignee: Barient Company, San Carlos, Calif.

[21] Appl. No.: 638,330

[22] Filed: Dec. 8, 1975

[51] Int. Cl.² ............................................. F16H 5/52
[52] U.S. Cl. .................................. 254/150 R; 74/810
[58] Field of Search .............. 254/150 R; 74/810, 812

[56] References Cited

U.S. PATENT DOCUMENTS

| | | | |
|---|---|---|---|
| 1,168,325 | 1/1916 | Mulligan | 74/812 |
| 2,536,615 | 1/1951 | Thiebaud | 74/812 X |
| 3,927,580 | 12/1975 | Fawcett | 254/150 R X |

Primary Examiner—Robert J. Spar
Assistant Examiner—Donald W. Underwood
Attorney, Agent, or Firm—Owen, Wickersham & Erickson

[57] ABSTRACT

A deck winch provides three separate speed ratios for its drum when its main shaft is turned. With an external control lever in a neutral position a high speed ratio is attained by rotation of the main shaft in a first direction, resulting in a low drum speed. A medium speed ratio is attained by rotation of the main shaft in a second, opposite direction. With the control lever in its active or low gear ratio position, rotation of the main shaft in the first direction moves the drum at its highest speed relative to the main shaft. When the control lever is in this active position and the main shaft is rotated in the second direction, the control lever is automatically shifted to its neutral position and the medium speed ratio is established. The control lever is connected internally to engage and disengage an idler gear that mechanically interconnects the main shaft with one or several driving gears for the drum. At any time the position of the control lever and the direction of main shaft rotation may be selected to provide any of the three speed ratios.

9 Claims, 9 Drawing Figures

THREE SPEED DECK WINCH

BACKGROUND OF THE INVENTION

This invention relates to mechanical winches and more particularly to multi-speed deck winches adaptable for use on sailing craft.

Winches having a two-speed capability have long been used on sailing craft as highly essential equipment for hauling lines to reef sails. The rapid changes in conditions and large wind forces that are often encountered make it desirable for the winch to shift rapidly into different speed or gear ratios. A greater number of available gear ratios allows a greater efficiency in meeting the variety of demands for sail handling. Attempts to increase this efficiency were made by those active in the art by providing a third and extra low speed gear ratio. Prior to the present invention these attempts involved essentially temporary direct coupling of the winch drive handle or shaft to the winch drum thereby providing a direct drive or 1:1 gear ratio. Examples of such direct drive 3-speed winches are shown in U.S. Pat. Nos. 3,656,596 and 3,802,665. Although somewhat successful, such direct drive arrangements were not satisfactory for a number of reasons. For one thing, the 1:1 gear ratio was too low and proved to be impractical for most normal winch operation. Moreover, the means for shifting into and out of low speed made the winch inconvenient to operate in some cases. Also, since the direct drive coupling was normally located on top of the winch drum, it eliminated the possibility of using a self-tailing device on the winch.

SUMMARY OF THE INVENTION

The present invention provides a three-speed unidirectional winch with a geared first speed, eliminating the problems and disadvantages inherent in prior three-speed winches utilizing a direct drive as a first speed. Instead of a direct drive, the first speed of the present winch utilizes internal gearing to provide the desired output drum speed, which is the highest drum speed of the three speeds available. This first speed usually has a gear ratio other than 1:1 on a winch of typical drum size, preferably somewhat higher than 1:1, since some gear reduction is normally desirable in operation as discussed above.

The first speed of the present winch is engaged by shifting a lever on the exterior of the winch base to an active position wherein an idler gear is put in meshed engagement with a main shaft gear. The idler gear is also permanently meshed with a gear connected to a drum driving pinion. Rotation of the main shaft in one direction via a crank handle thus drives the drum at the lowest gear ratio or highest speed. However, if the main shaft is then rotated in the reverse direction the idler gear, which is swingable on a pivoted carrier, is pushed out of engagement with the main shaft gear by a tangential force from the main shaft gear. This shifts the exterior lever to an inactive or neutral position, and the idler gear and shift lever assembly remain in this position until the first winch speed is again selected by manual shifting of the lever to the active position.

Meanwhile, rotation of the main shaft in this reverse direction rotates the drum at a second, slower speed via a second main shaft gear directly enmeshed with a second drive pinion gear. The second drive pinion gear is engaged in a one-way ratchet connection with the drive pinion so that it is ineffective to drive the pinion when the first speed is engaged and operative.

The second drive pinion gear is also ineffective to drive the pinion when a third speed of highest gear ratio is operative. A third main shaft gear is permanently drivingly connected to a third drive pinion gear via an idler gear, so that operation of the winch in the third speed requires rotation of the crank handle and main shaft in the first direction, like the first speed. This of course results in inoperative slippage of the ratcheted second drive pinion gear. Selection between the first and third speeds, wherein the direction of main shaft rotation is the same, is made by selection of the proper first speed shift lever position.

So that the third speed gearing does not interfere with the operation of second or first speed, the third drive pinion gear, like the second, is connected by ratchet to the drive pinion. Only rotation of the main shaft in the one direction will thus operate the winch in the third speed. Also, if the first speed is engaged, via the first speed idler gear, it will override the third speed gearing by rotating the drive pinion at a faster speed than the third drive pinion gear, causing the third gear to slip on the pinion as both rotate in the same direction.

The ratchet connections and opposite rotational sense driving connections of the second and third speed gearing are similar to apparatus employed on prior two-speed winches wherein two separate winch drum speeds are obtained by different directions of crank handle rotation. However, the present invention adds a third, internally geared speed (herein called the first speed) by the swingable idler gear apparatus described above. This low gear ratioed first speed fully cooperates with and does not interfere with the second and third speed gearing. In fact, the gearing is automatically shifted if, as is often the case, it is desirable to progress through the three speeds using first, then second, one third in the reefing of a sail. A direct shift from first to third speed can be quickly made by momentarily rotating the crank handle in the reverse direction, then proceeding again in the original direction. The only occasion requiring manual shifting of the exterior shift lever is when the first speed is needed following operation of the winch in second or third speed.

DESCRIPTION OF THE PREFERRED EMBODIMENT

Figure 1:
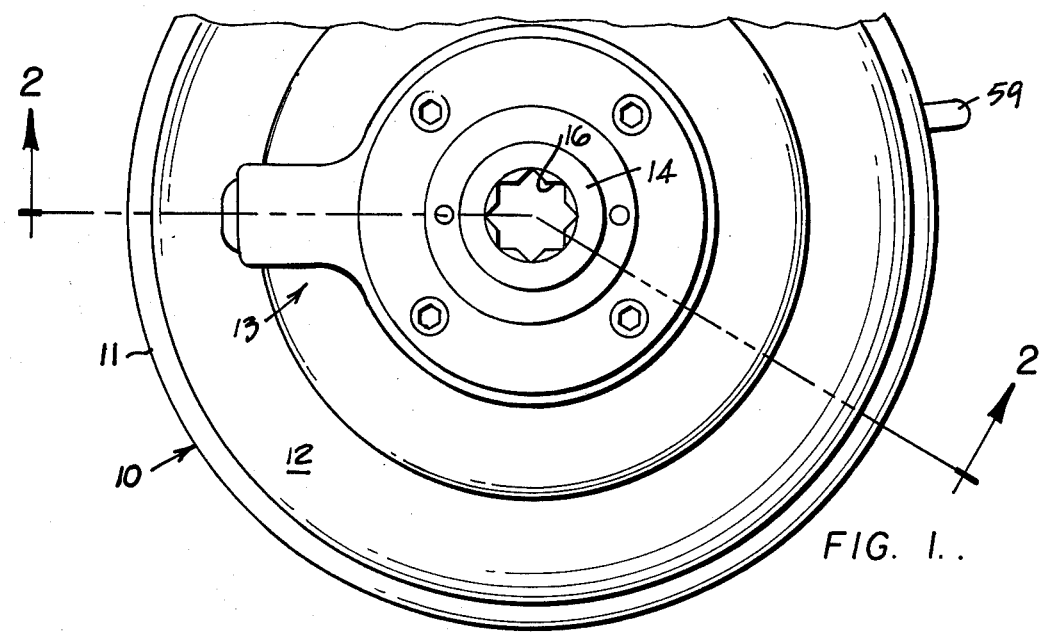
FIG. 1 is a partial plan view of the three-speed winch apparatus of the invention.

In the drawings, FIG. 1 is a partial plan view showing a three-speed winch 10 according to the invention, including a base 11, a drum 12, a self-tailing device generally indicated as 13, and a main shaft 14 including a socket 16 for receiving a crank handle (not shown) which may be inserted therein.

Figure 2:
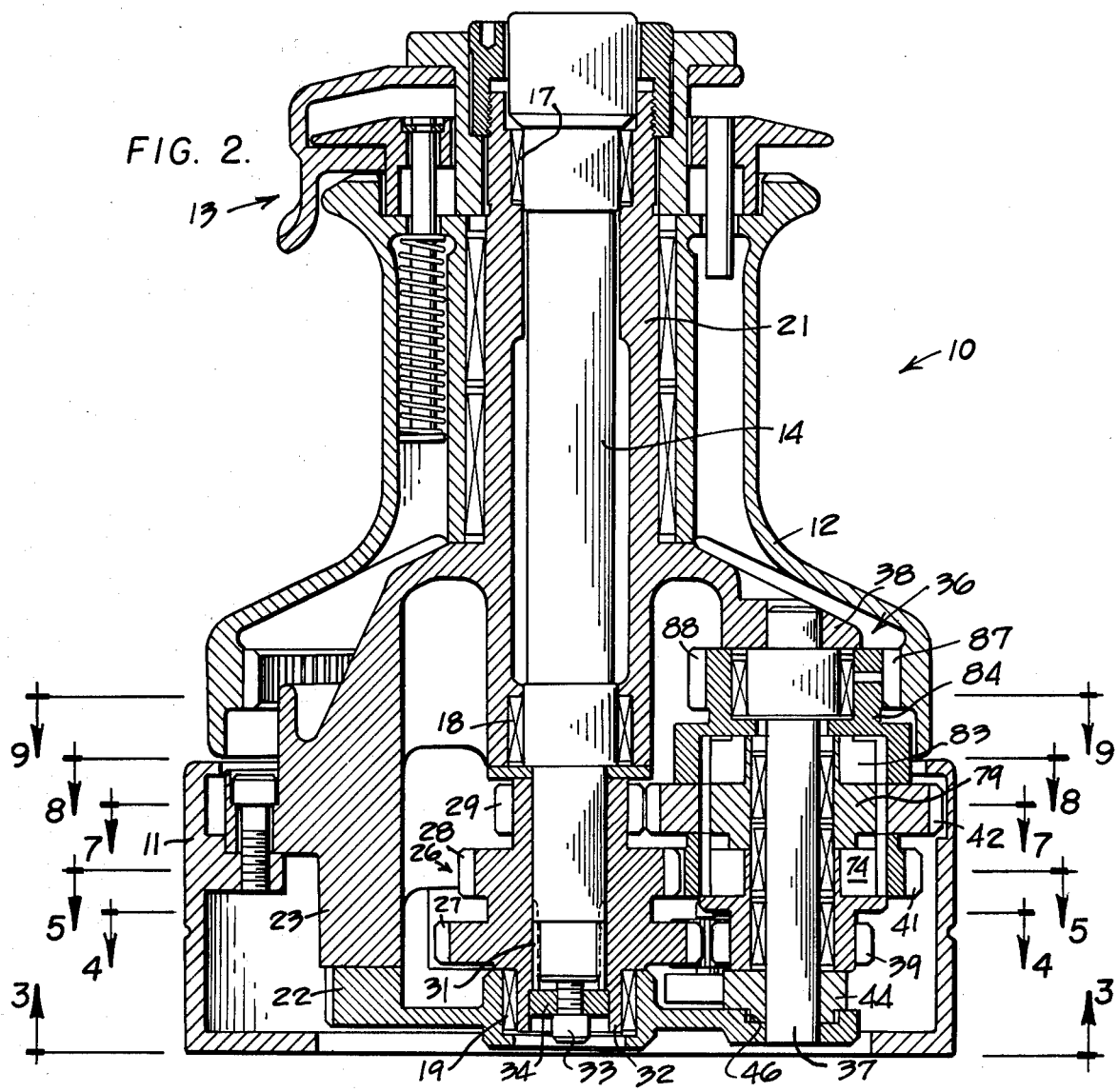
FIG. 2 is an elevational sectional view of the winch, taken along the line 2—2 of FIG. 1.

FIG. 2 shows the winch 10 in elevational section. The self-tailing device 13, although indicated in the drawing, does not form a part of this invention and is optional on the three-speed winch described herein. If included, the self-tailing device 13 may be in accordance with that shown and described in co-pending U.S. application Ser. No. 568,304, filed Apr. 15, 1975 and assigned to the same assignee as the present invention.

As shown in FIG. 2, the main shaft 14 of the winch is supported in the base 11 by roller bearings 17, 18 and 19. Each set of bearings is journalled in a respective portion of the base 11, the bearings 17 and 18 being located in a central tubular member 21 of the base and the bearing 19 being located in a gear cover 22 at the bottom of the winch 10. The gear cover 22 may be affixed to other structural members 23 of the base 11 by bolts 24, for example, shown in the bottom plan view of FIG. 3.

At the lower end of the main shaft 14 is a cluster gear 26 including a first gear 27 of largest diameter, a second gear 28 of intermediate size, and a smallest third gear 29, corresponding to first, second and third speeds of the winch, respectively. The cluster gear 26 is affixed to the shaft 14 by a spline connection 31 shown in FIGS. 2 and 4, so that each of the main shaft gears 27, 28 and 29 rotates at the same speed as the main shaft 14. A bottom sleeve 32 of the cluster gear 26 forms a bearing surface with the bearings 19, and a bolt 33 and washer 34 within the sleeve may be used to retain the cluster gear to the shaft, as shown in FIG. 2.

Figure 3:
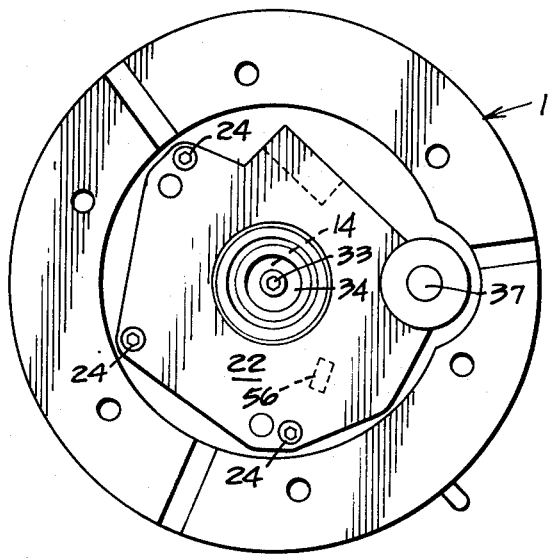
FIG. 3 is a bottom plan view of the winch taken along the line 3—3 of FIG. 2.

Adjacent to and parallel to the main shaft 14 is a pinion assembly 36 including a pinion shaft 37 stationarily mounted in the gear cover 22 at its lower end and in a structural arm 38 of the base 11 at its upper end. FIG. 3 shows the relative positions of the main shaft 14 and the pinion shaft 37 from the bottom of the winch, both being retained in position by the gear cover 22.

The pinion assembly 36 cooperates with the main shaft gears 27, 28 and 29 to provide three separate drum speeds for a given main shaft speed, or three separate gear ratios for driving the drum in a single direction. A first pinion gear 39 corresponds to the first main shaft gear 27, a second pinion gear 41 to the second main shaft gear 28, and a third pinion gear 42 to the third main shaft gear 29. Only the second gears 28 and 41 are directly enmeshed; the other gear pairs are drivingly connected via idler gears described below. Thus, rotation of the main shaft 14 in one direction is required to drive the drum 12 via the first and third speed gearing, while rotation of the shaft in the opposite direction is required to drive the drum via the second speed gearing.

Figure 4:
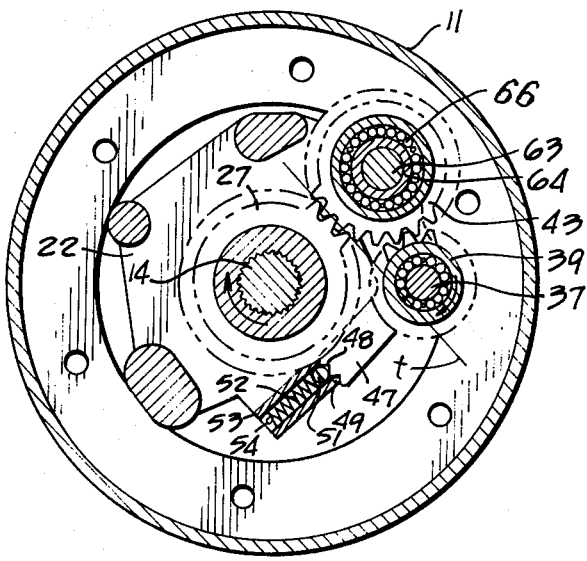
FIG. 4 is a sectional view taken along the line 4—4 of FIG. 2, illustrating the first speed gearing of the winch.

The first speed gearing of the winch 10 is illustrated in the sectional view of FIG. 4. A first speed idler gear 43 is permanently meshed with the first pinion gear 39, being rotatably mounted on an idler carrier 44 which is pivotal on the pinion shaft 37 below the gear 39 to provide a shifting function. As seen in FIG. 2, the idler carrier 44 is also seated in a recess 46 of the gear cover 22. When the carrier 44 is in the engaged position of FIG. 4, rotation of the main shaft 14 in a clockwise direction rotates the first pinion gear 39 and ultimately, as will be seen below, the drum 12, in a clockwise direction. However, rotation of the main shaft in a counterclockwise direction will not rotate the pinion gear 39 counterclockwise, since this would conflict with the second speed gearing, which is operative by counterclockwise main shaft rotation as will be seen below. Instead, such rotation of the main shaft will kick the idler gear 43 and idler carrier 44 away from the first main shaft gear 27 into a disengaged position. This occurs partially due to the separation force between the two gears, but primarily because of a tangential force exerted on the idler gear 43 at the mesh point by the first main shaft gear 27. The tangential force works to pivot the idler carrier 44 toward a disengaged position because a tangential line $t$ (along which the force acts) through the mesh point of the two gears passes outside the space between the rotational axes of the idler gear 43 and the idler carrier 44, the latter axis being coincident, in this preferred embodiment, with the axis of the first pinion gear 39. As can be envisioned from FIG. 4, a force which so acts on the idler gear 43 has a moment arm by which it can pivot the idler carrier and gear about the pivot axis of the carrier. If the force is in a direction tending to rotate the idler gear 43 clockwise (counterclockwise input on the main shaft 14), the idler carrier 44 pivots clockwise to a disengaged position. On the other hand, if the force is in the opposite direction, tending to rotate the idler gear 43 and carrier 44 counterclockwise (the active first speed direction), such force merely tends to hold the gears enmeshed due to the same moment arm.

It should be noted that the above relationship holds true as long as the first main shaft gear 27, which provides the input force, is on the side of the idler gear 43 and of the idler 44 shown; if it were on the opposite side, counterclockwise rotation of the main shaft 14 would still tend to draw the carrier 44 clockwise, but such movement would be blocked by the first main shaft gear 27 itself. In such a case, clockwise rotation of the gear 27 would tend to push the carrier away in counterclockwise rotation, and in order to utilize this effect in accordance with the invention, the other gearing of the winch 10 would have to be reversed accordingly. Further, if the three first speed gears were positioned with their axes in a line, rotation of the main shaft gear 27 in either direction would tend to move the carrier 44, but a stop preventing its movement in the undesired direction would make advantageous use of the principle described.

Figure 6:
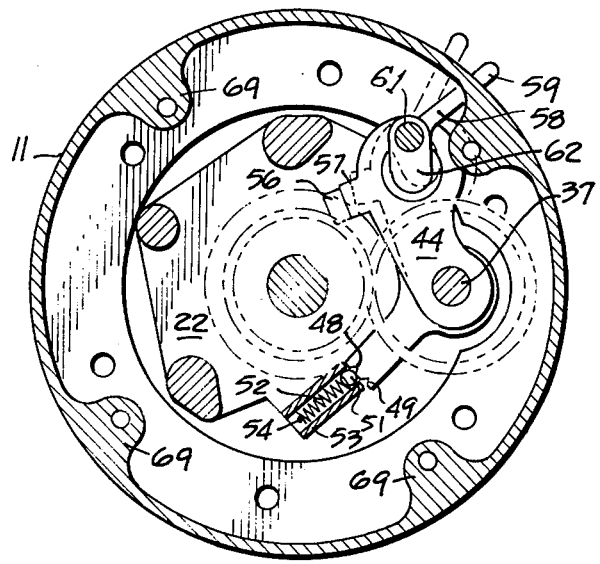
FIG. 6 is a sectional view similar to that of FIG. 5 but with parts removed to further illustrate the first speed gearing of the winch.

As shown in FIGS. 4 and 6, the idler carrier 44 includes a leg 47 having a pair of notches 48 and 49 engageable by a detent ball 51 biased toward the leg 47 by a compression spring 52. The spring 52 is positioned in a sleeve 53 attached to the gear cover 22, with a pin 54 bracing its opposite end. When the detent ball 51 is in the notch 48 as shown in FIG. 4 and in solid lines to FIG. 6, it helps hold the idler carrier 44 in engaged position, so long as the main shaft 14 is rotated clockwise. Also to help define the engaged position of the carrier 44, an upwardly projecting stud 56 may be provided on the gear cover 22 for abutting contact with a projection 57 of the carrier 44, as shown in FIG. 6.

When the main shaft is rotated counterclockwise, the idler carrier 44 is pivoted clockwise to the extent that the detent ball 51 is pushed back from the leg notch 48 and becomes seated in the other leg notch 49. This yieldably retains the idler carrier 44 in a disengaged position wherein the gears 27 and 43 are out of contact.

Figure 5:
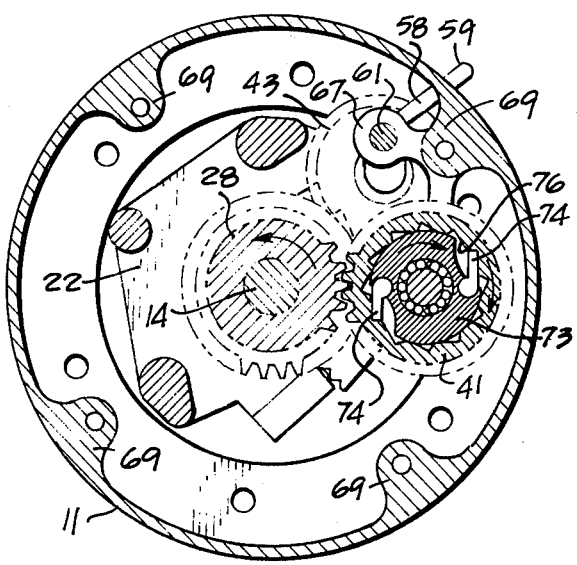
FIG. 5 is a sectional view taken along the line 5—5 of FIG. 2, illustrating the second speed gearing and a shifting mechanism associated with the first speed gearing below.

FIGS. 5 and 6 illustrate further details of the first speed shifting mechanism. FIG. 5 is actually a view looking downwardly through the second speed gearing, described below, but it illustrates a shifter lever 58 which changes its position automatically when the first speed gearing disengages and which may be manually operated to re-engage the first speed gearing. FIG. 6 is a similar view but with the second speed gearing, the idler gear 43 and other components removed for clarity.

As shown in FIG. 6, the shifter lever 58 includes an arm 59 extending exteriorly of the winch base 11, a central pivot stud 61 and an interior leg 62 from which a projection 63 (seen only in FIG. 4) extends downwardly into a sleeve 64 associated with a bearing 66 of the first speed idler gear 43. The idler gear 47, not shown in FIG. 6, is between the shifter lever 58 and the idler carrier 44. The lever 58 pivots via the pivot stud 61, which extends upwardly into a collar 67 above (see FIG. 5). The collar 67 may be affixed to one of a plurality of peripheral mounting brackets 69 connected to the base 11. When the idler carrier 44 and the idler gear 43 are kicked out to the disengaged position by counterclockwise rotation of the main shaft 14, the projection 63 of the shifter lever 58 is moved along with the center of the idler gear 43 to pivot the lever 58 counterclockwise about the pivot stud 61. The exterior lever arm 59 thus flips to a disengaged position counterclockwise of its engaged position. Similarly, the exterior lever arm 59 may be manually shifted clockwise to re-engage the first-speed gearing. The lever 58 thus acts not only to provide mechanical advantage in the shifting of the first speed gearing, but also to lend a directional orientation to the position of the lever arm 59—in order to engage the first speed gearing, which involves clockwise rotation of the main shaft, the lever arm 59 must be moved in the clockwise direction.

It should be understood that the pivot point of the idler gear carrier 44 need not be the axis of the pinion assembly 36 as it is in this preferred embodiment. The pivot point could be at a location somewhat spaced from the pinion shaft 37, with the effect that the idler gear 43 would be disengaged from both other first speed gears 27 and 39 when the idler carrier is shifted. Also, the pivot point could be located at the main shaft axis, provided that a tangential line through the mesh point of the idler gear 43 and the first pinion gear 39 would not pass between the axes of the main shaft and the idler gear.

FIG. 5 also shows the second speed gearing of the winch 10. The second, smaller main shaft gear 28 is in constant meshed engagement with the second pinion gear 41. This ring-shaped gear 41 surrounds a pinion hub 73 which is affixed to the first pinion gear 39 as shown in FIG. 2, with a one-way drive connection between the gear 41 and the hub 73. Preferably a pawl and ratchet connection is used, with a pair of pawls 74 pivotal from the hub 73 and engageable with a ratcheted inside surface 76 of the gear 41, but any suitable one-way drive mechanism may be used. The pawls 74 are biased outwardly by torsion springs (not shown) in a manner well known in the art and typical of pawl-and-ratchet construction.

When the main shaft 14 is rotated counterclockwise, the first speed gearing is disengaged as discussed above, and the second pinion gear is rotated clockwise so that it is effective to drive the pinion hub 73 in a clockwise direction as shown in FIG. 5. However, when the first speed gearing is engaged and active, with the main shaft 14 rotating in a clockwise direction, the second speed gearing will be inoperative since the counterclockwise rotating ratcheted gear 41 will slip over the pawls 74 of the pinion hub 73, which will be rotating clockwise.

Figure 7:
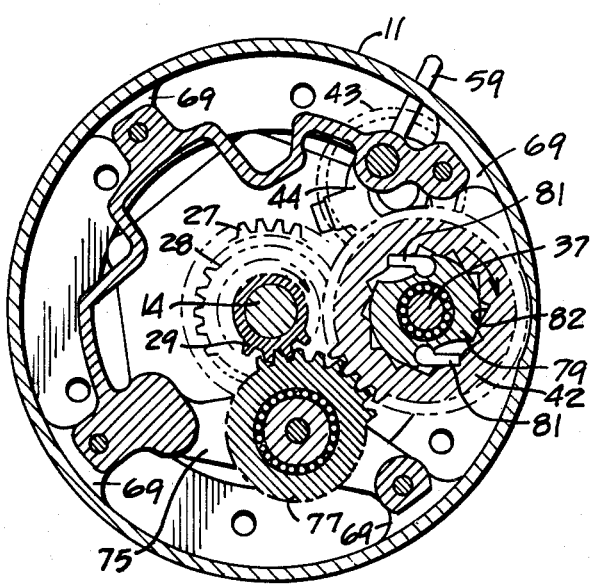
FIG. 7 is a sectional view taken along the line 7—7 of FIG. 2, illustrating the third speed gearing of the winch.

The third speed gearing is shown in FIG. 7. As mentioned above, this gearing is directionally similar to the first speed gearing in that it includes a third speed idler gear 77, shown supported in FIG. 7 by a structural plate 75 extending between other structural members affixed to the winch base 11. The idler 77 is in constant meshed engagement with the third main shaft gear 29, the smallest of the three main shaft gears, and with the third pinion gear 42, the largest of the three pinion gears. The third speed gearing thus has the highest gear ratio of the three speeds. Within the gear 42, forming a one-way drive connection similar to that of the second speed gearing, is an upper pinion hub 79 carrying a pair of pawls 81 which engage with an inner ratchet surface 82 of the gear 42 under certain conditions. For such engagement, the pinion gear 42 must not only be rotating in a clockwise direction (always the direction of rotation of the hub 79); it must also be rotating at least the speed of the hub 79, i.e., if the hub 79 is rotating faster than the gear 42, the third speed gearing will be ineffective. This occurs when the first speed gearing is engaged, since the upper pinion hub 79 is keyed into or directly affixed to the lower pinion hub 73 (see FIG. 2—key connection not shown) and first speed is of a lower gear ratio. Therefore, whenever the shift lever arm 59 is in the engaged position and the main shaft 14 is rotated clockwise. The first speed gearing will override the third speed gearing. When the first speed idler 43 is disengaged, by counterclockwise main shaft rotation or by manual shifting of the lever arm 59, the third speed gearing is operative in response to clockwise main shaft rotation.

The elevational view of FIG. 2 does not show the pawls 81 of the third speed gearing, although those (74) of the second speed gearing are shown. The pawls 81 are hidden in FIG. 2, being staggered from those of the second speed gearing and not occurring along the cross section shown in the figure.

Figure 8:
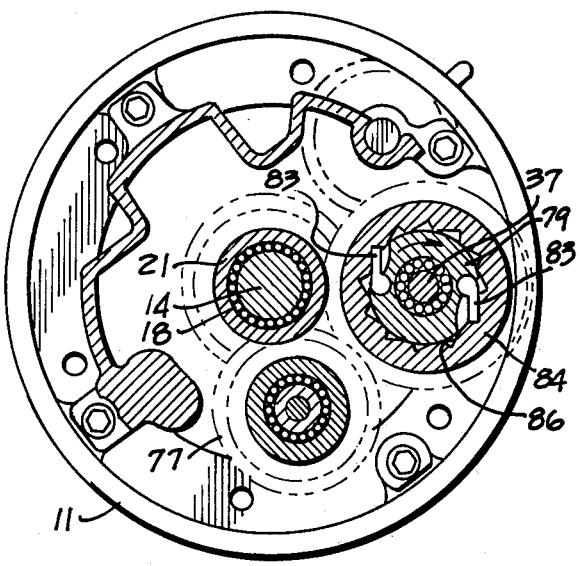
FIG. 8 is a sectional view taken along the line 8—8 of FIG. 2, illustrating a ratchet connection between a pinion hub and a pinion gear of the winch.
Figure 9:
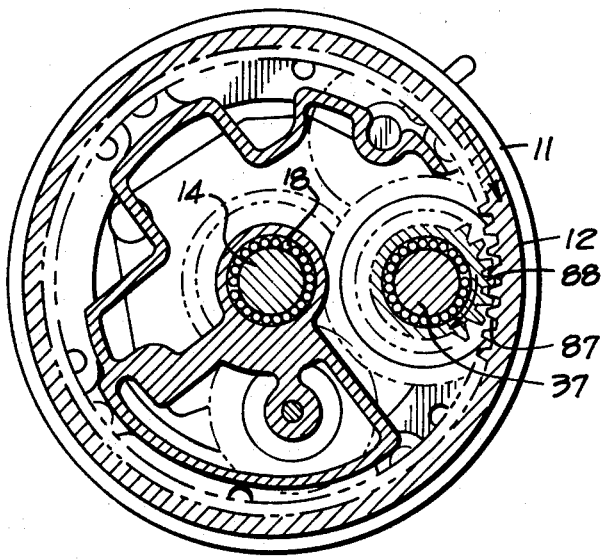
FIG. 9 is a sectional view taken along the line 9—9 of FIG. 2, illustrating a driving connection between the pinion gear and the drum of the winch.

Another set of pawls 83 is carried by the upper pinion hub 79, above and staggered from the pawls 81 and visible in FIG. 2. These pawls provide a one-way driving connection between the upper pinion hub 79 and a pinion drive member 84 which is rotationally independent of both the third pinion gear 42 and the upper pinion hub 79. As seen in the sectional view of FIG. 8, the pinion drive member 84 has an inner ratchet surface 86 with which the pawls 83 coact. This one-way drive connection appears in the opposite rotational sense as that of the second and third speed gearing, since at this point it is the pawl-carrying hub 79 driving the surrounding ratchet wheel 84, rather than the surrounding wheel driving the hub. The function of this final one-way drive connection is to permit override of the gearing by the drum 12 when a loose line wrapped around the drum is being drawn in manually previous to the use of the winch's gearing. The drum 12 is drivingly connected to the pinion drive member 84 via an interior drum gear 87 and a pinion drive gear 88 meshed therewith (see also FIG. 9). When the pinion hubs 73 and 79 are rotating clockwise due to use of the first, second or third speed gearing, the ratchet connection shown in FIG. 8 is effective to drive the pinion drive member 84, including the drive gear 88, so that the drum 12 is driven accordingly. If the drum 12 is rotated manually to override the gearing, the pinion drive member 84 slips with respect to the upper pinion hub 79 so that the drum can rotate freely.

It should be understood that although certain types of driving connection and a preferred arrangement of components have been shown and described for this preferred embodiment of a three-speed winch 10, these are only illustrative and may be altered without departing from the invention. For example, other types of one-way driving connections such as wedging type clutches may be employed rather than the pawl and ratchet connections shown. The gears may be replaced with other driving means such as friction drive or even sprocket and chain drive in the case of most driving connections shown. The arrangement of first, second and third speed gearing in bottom to top order is merely for convenience and may be altered if desirable. These and other alterations to the preferred embodiment will be apparent to those skilled in the art and may be made without departing from the spirit and scope of the invention.

I claim:

1. A three speed winch comprising:
    a base;
    a generally cylindrical drum rotatably supported on the base;
    a rotatable shaft extending centrally and axially through the drum and the base, including means for receiving a driving means;
    a rotatable member mounted on the base and in driving engagement with the drum;
    internal gearing means and clutch means associated with the shaft and the rotatable member for driving the rotatable member and the drum is a single direction at two different speeds when the shaft is rotated at the same speed in opposite directions, providing second and third speeds;
    a first speed drive gear connected to and rotatable with the shaft;
    a corresponding gear rotatably mounted on the base and generally coplanar with and spaced from the first speed drive gear, said corresponding gear being in driving connection with the rotatable member;
    idler gear means for selectively engaging both the first speed drive gear and the corresponding gear; and
    means for disengaging the idler gear means from at least one of the first speed drive gear and the corresponding gear in response to rotation of the shaft in a predetermined one of said opposite directions.

2. The three-speed winch of claim 1 wherein the idler gear means comprises a swingable carrier pivotally mounted on the axis of the corresponding gear and an idler gear rotatably mounted on the swingable carrier, said idler gear being in permanent meshed engagement with the corresponding gear and being selectively engageable with the first speed drive gear by pivotal movement of the swingable carrier.

3. The three-speed winch of claim 1 wherein the idler gear means and the disengaging means comprise a swingable carrier pivotally mounted on the axis of the corresponding gear and an idler gear rotatably mounted on the swingable carrier, said idler gear being in permanent meshed engagement with the corresponding gear and being selectively engageable with the first speed drive gear by pivotal movement of the swingable carrier, said first speed drive gear and said idler gear, when engaged, being so positioned with respect to the corresponding gear that a tangential line through the mesh point of the first speed drive gear and the idler gear passes outside a space between the axes of the idler gear and the corresponding gear, whereby the tangential force exerted on the idler gear by the first speed drive gear, when the shaft is rotated in said predetermined one direction, will swing the swingable carrier about the axis of the corresponding gear to disengage the idler gear from the first speed drive gear.

4. The three-speed winch of claim 3 which further includes yieldable means for retaining the idler gear spaced and disengaged from the first speed drive gear when the idler gear has been swung into disengagement therefrom, and a lever connected to the swingable carrier and extending exterior of the winch for manually returning the carrier and the idler gear to engaged position.

5. A three-spaced winch, comprising:
    a base;
    a generally cylindrical drum rotatably supported on the base for exteriorly receiving a line;
    a rotatable main shaft extending centrally and axially through the drum and the base, said main shaft being adapted to receive a driving means;
    a drum driving pinion rotationally mounted within the base parallel to the main shaft, said pinion being drivingly connected with the drum;
    first speed gearing between the main shaft and the pinion, including a first main shaft gear affixed to the main shaft, a first pinion gear affixed to the pinion and spaced from the first main shaft gear, a first speed idler gear, means mounting the idler gear for selective engagement with both gears for rotating the pinion in one direction when the main shaft is rotated in said one direction, and means for disengaging the idler gear from at least one of said gears in response to rotation of the main shaft in the opposite direction;
    second speed gearing between the main shaft and the pinion, including a second main shaft gear mounted on the main shaft, a second pinion gear mounted on the pinion and directly engaged with the second main shaft gear, and means connecting one of the second main shaft gear and the second pinion gear in a one way drive connection with its respective mount;
    third speed gearing between the main shaft and the pinion, including a third main shaft gear mounted on the main shaft, a third pinion gear mounted on the pinion and spaced from the third main shaft gear, a third speed idler gear mounted within the base and engaged with both said gears, and means connecting one of the third main shaft gear and the third pinion gear in a one way drive connection with its respective mount, said third speed gearing having a gear ratio higher than that of the first speed gearing.

6. The three-speed winch of claim 5 wherein said first speed idler gear mounting means and said disengaging means comprise a swingable carrier pivotally mounted on one of the pinion axis and the main shaft axis and rotationally supporting the first speed idler gear, said first speed idler gear being permanently meshed with one of the first pinion gear and the first main shaft gear and being selectively engageable with the other of said gears by pivotal movement of the swingable carrier, the three gears of said first speed gearing being so positioned when fully enmeshed that a tangential line through the mesh point of the first speed idler gear and said other gear passes outside a space between the axes of the first speed idler gear and said one gear with which it is permanently enmeshed.

7. The three speed winch of claim 6 which further includes yieldable means for retaining the first speed idler gear spaced and disengaged from said other gear when the first speed idler gear has been swung into disengagement therefrom, and a lever connected to the swingable carrier and extending exterior of the winch for manually returning the carrier and the first speed idler gear to engaged position.

8. The three speed winch of claim 5 wherein said drum driving pinion includes one-way drive means for driving the drum in one direction only, whereby the drum may be freely overrun without any of the first, second or third speed gearing being driven with the drum.

9. The three speed winch of claim 1 which further includes means providing a one-way drive connection between the internal gearing and clutch means and the rotatable member, and between the corresponding gear and the rotatable member, whereby the drum may be freely overrun in said single direction without the internal gearing being driven with the drum.

* * * * *